(12) United States Patent
Zhao et al.

(10) Patent No.: US 11,597,303 B2
(45) Date of Patent: Mar. 7, 2023

(54) POWER SUPPLY CONNECTION FOR POWER LONG RAIL ASSEMBLY

(71) Applicants: Magna Seating Inc., Aurora (CA); Kai Zhao, Rochester Hills, MI (US); Michael D Nacy, Lake Orion, MI (US); Detjon Marini, White Lake, MI (US); Louis Vetere, II, Commerce Township, MI (US); Cheikh Dioum, Farmington Hills, MI (US)

(72) Inventors: Kai Zhao, Rochester Hills, MI (US); Michael D Nacy, Lake Orion, MI (US); Detjon Marini, White Lake, MI (US); Louis Vetere, II, Commerce Township, MI (US); Cheikh Dioum, Farmington Hills, MI (US)

(73) Assignee: Magna Seating Inc, Aurora (CA)

( * ) Notice: Subject to any disclaimer, the term of this patent is extended or adjusted under 35 U.S.C. 154(b) by 0 days.

(21) Appl. No.: 17/312,969

(22) PCT Filed: Dec. 11, 2019

(86) PCT No.: PCT/US2019/065631
§ 371 (c)(1),
(2) Date: Jun. 11, 2021

(87) PCT Pub. No.: WO2020/123595
PCT Pub. Date: Jun. 18, 2020

(65) Prior Publication Data
US 2022/0048410 A1    Feb. 17, 2022

Related U.S. Application Data

(60) Provisional application No. 62/777,793, filed on Dec. 11, 2018.

(51) Int. Cl.
*B60N 2/00* (2006.01)
*B60N 2/07* (2006.01)
*B60N 2/02* (2006.01)

(52) U.S. Cl.
CPC ......... *B60N 2/0722* (2013.01); *B60N 2/0244* (2013.01); *B60N 2/0705* (2013.01); *B60N 2002/0264* (2013.01)

(58) Field of Classification Search
None
See application file for complete search history.

(56) References Cited

U.S. PATENT DOCUMENTS

| | | | |
|---|---|---|---|
| 6,244,660 B1 * | 6/2001 | Yoshimatsu | ......... B60N 2/0232 297/344.1 |
| 6,267,430 B1 | 7/2001 | Cresseaux | |

(Continued)

FOREIGN PATENT DOCUMENTS

| | | |
|---|---|---|
| EP | 2298609 | 12/2012 |
| GB | 2509371 | 7/2014 |

*Primary Examiner* — Steven M Marsh
(74) *Attorney, Agent, or Firm* — Miller Canfield

(57) ABSTRACT

A long rail assembly for use in a vehicle includes a fixed rail, a movable rail, a power strip, a latch power connector, and a channel power connector. The fixed rail extends longitudinally along a floor of the vehicle. The movable rail is slidably coupled to the fixed rail. The power strip is coupled to the fixed rail. The latch power connector is removably coupled to the movable rail. The channel power connector is fixedly coupled to the movable rail and is in constant sliding contact with the power strip. When the latch power connector is coupled to the movable rail, the latch power connector frictionally engages the channel power connector thereby generating an electrical bridge between the power strip and the latch power connector to provide power to the long rail assembly.

25 Claims, 7 Drawing Sheets

(56) References Cited

U.S. PATENT DOCUMENTS

| | | | |
|---|---|---|---|
| 6,279,981 B1 | 8/2001 | Mesnage | |
| 6,688,667 B2* | 2/2004 | Nishimoto | B60N 2/067 |
| | | | 296/65.13 |
| 6,691,971 B2 | 2/2004 | Yamada et al. | |
| 6,959,900 B2* | 11/2005 | Hoshihara | B60N 2/0232 |
| | | | 248/424 |
| 7,331,558 B2 | 2/2008 | Jeong | |
| 8,733,725 B2* | 5/2014 | Kimura | B60N 2/0232 |
| | | | 296/65.13 |
| 8,844,891 B2 | 9/2014 | Yamada et al. | |
| 9,381,876 B2 | 7/2016 | Terada et al. | |
| 10,011,195 B2 | 7/2018 | Kume et al. | |
| 11,260,776 B1* | 3/2022 | Aktas | B60N 2/12 |
| 2003/0168566 A1* | 9/2003 | Ito | B60N 2/067 |
| | | | 248/429 |
| 2006/0237619 A1* | 10/2006 | Nakamura | B60N 2/067 |
| | | | 248/429 |
| 2006/0261236 A1* | 11/2006 | Weber | B60N 2/0717 |
| | | | 248/424 |
| 2010/0320352 A1* | 12/2010 | Weber | B60N 2/067 |
| | | | 74/89.23 |
| 2016/0114703 A1* | 4/2016 | Fujita | B60N 2/0244 |
| | | | 248/550 |
| 2021/0394647 A1* | 12/2021 | Shim | B60N 2/0232 |
| 2022/0024355 A1* | 1/2022 | Napau | B60N 2/0232 |

* cited by examiner

POWER SUPPLY CONNECTION FOR POWER LONG RAIL ASSEMBLY

CROSS-REFERENCE TO RELATED APPLICATIONS

This application claims priority to and all the benefits of U.S. Provisional Patent Application No. 62/777,793, filed Dec. 11, 2018, and entitled "Power Supply Connection for Power Long Rail Assembly," the disclosure of which is hereby incorporated by reference in its entirety.

BACKGROUND OF THE INVENTION

1. Field of the Invention

The present invention relates to a power supply connection for a long rail assembly that automatically creates an electrical connection between a removable seat assembly and a vehicle electrical system when the seat assembly is installed into an automotive vehicle.

2. Description of Related Art

Multi-purpose, semi-autonomous, and fully autonomous vehicles are being introduced into the market. It is desirable to have a vehicle with an interior space that can be changed or reconfigured for various functions. For example, a consumer may want to remove a second and/or third row of seat assemblies to allow for more cargo space. In the future, with fully autonomous vehicles, a consumer may want to remove all of the seat assemblies creating a large, open, and multi-functional vehicle interior.

Removable seat assemblies in vehicles incorporate various systems that require power to be supplied to the seat assembly. These systems include power recliners, seat adjusters, latches and other electrical functions. Conventional removable seat assemblies are connected to the vehicle's electrical system after they are installed through plugs or other connector means. It is desirable to have a system that automatically creates an electrical connection between the removable seat assembly and the vehicle electrical system when the seat assembly is installed in the vehicle.

SUMMARY OF THE INVENTION

According to one embodiment, there is provided a long rail assembly for use in a vehicle comprising a fixed rail, a movable rail, a power strip, a latch power connector, and a channel power connector. The fixed rail is adapted to extend longitudinally along a floor of the vehicle. The movable rail is slidably coupled to the fixed rail. The power strip is coupled to the fixed rail. The latch power connector is removably coupled to the movable rail. The channel power connector is fixedly coupled to the movable rail and is in constant sliding contact with the power strip. When the latch power connector is coupled to the movable rail, the latch power connector frictionally engages the channel power connector thereby generating an electrical bridge between the power strip and the latch power connector to provide power to the long rail assembly.

According to another embodiment, there is provided a long rail assembly for use in a vehicle comprising a first fixed rail, a second fixed rail, a first movable rail, a second movable rail, a first power strip, a second power strip, a first latch power connector, a second latch power connector, a first channel power connector, and a second channel power connector. The first fixed rail is adapted to extend longitudinally along a floor of the vehicle. The second fixed rail is adapted to extend longitudinally along the vehicle floor. The first movable rail is slidably coupled to the first fixed rail. The second movable rail is slidably coupled to the second fixed rail. The first power strip is coupled to the first fixed rail. The second power strip is coupled to the second fixed rail. The first latch power connector is removably coupled to the first movable rail. The second latch power connector is removably coupled to the second movable rail. The first channel power connector is fixedly coupled to the first movable rail and is in constant sliding contact with the first power strip. The second channel power connector is fixedly coupled to the second movable rail and is in constant sliding contact with the second power strip. When the first latch power connector is coupled to the first movable rail and the second latch power connector is coupled to the second movable rail, the first latch power connector frictionally engages the first channel power connector thereby generating an electrical bridge between the first power strip and the first latch power connector, and the second latch power connector frictionally engages the second channel power connector thereby generating an electrical bridge between the second power strip and the second latch power connector to provide power to the long rail assembly.

According to another embodiment, there is provided a seat assembly and long rail assembly for use in a vehicle. The seat assembly comprises a seat cushion, a seat back, a mounting structure, a fixed rail, and a movable rail. The long rail assembly comprises a power strip, a latch power connector, and a channel power connector. The seat back is operatively coupled to the seat cushion. The mounting structure supports the seat cushion above a floor of the vehicle. The fixed rail is adapted to extend longitudinally along the vehicle floor. The movable rail is slidably coupled to the fixed rail. The power strip is coupled to the fixed rail. The latch power connector is fixedly coupled to the mounting structure and removably coupled to the movable rail. The channel power connector is fixedly coupled to the movable rail and is in constant sliding contact with the power strip. When the latch power connector is coupled to the movable rail, the latch power connector frictionally engages the channel power connector thereby generating an electrical bridge between the power strip and the latch power connector to provide power to the seat assembly.

BRIEF DESCRIPTION OF THE DRAWINGS

Advantages of the present disclosure will be readily appreciated as the same becomes better understood by reference to the following detailed description when considered in connection with the accompanying drawings wherein.

DETAILED DESCRIPTION OF THE EMBODIMENTS

FIGS. 1-8 illustrate a plurality of long rail assemblies 10 configured to provide power and sliding adjustment to a plurality of removable seat assemblies 12 in an automotive vehicle according to embodiments described herein. Directional references employed or shown in the description, figures, or claims, such as top, bottom, upper, lower, upward, downward, lengthwise, widthwise, left, right, and the like, are relative terms employed for ease of description and are not intended to limit the scope of the invention in any respect.

Figure 1:
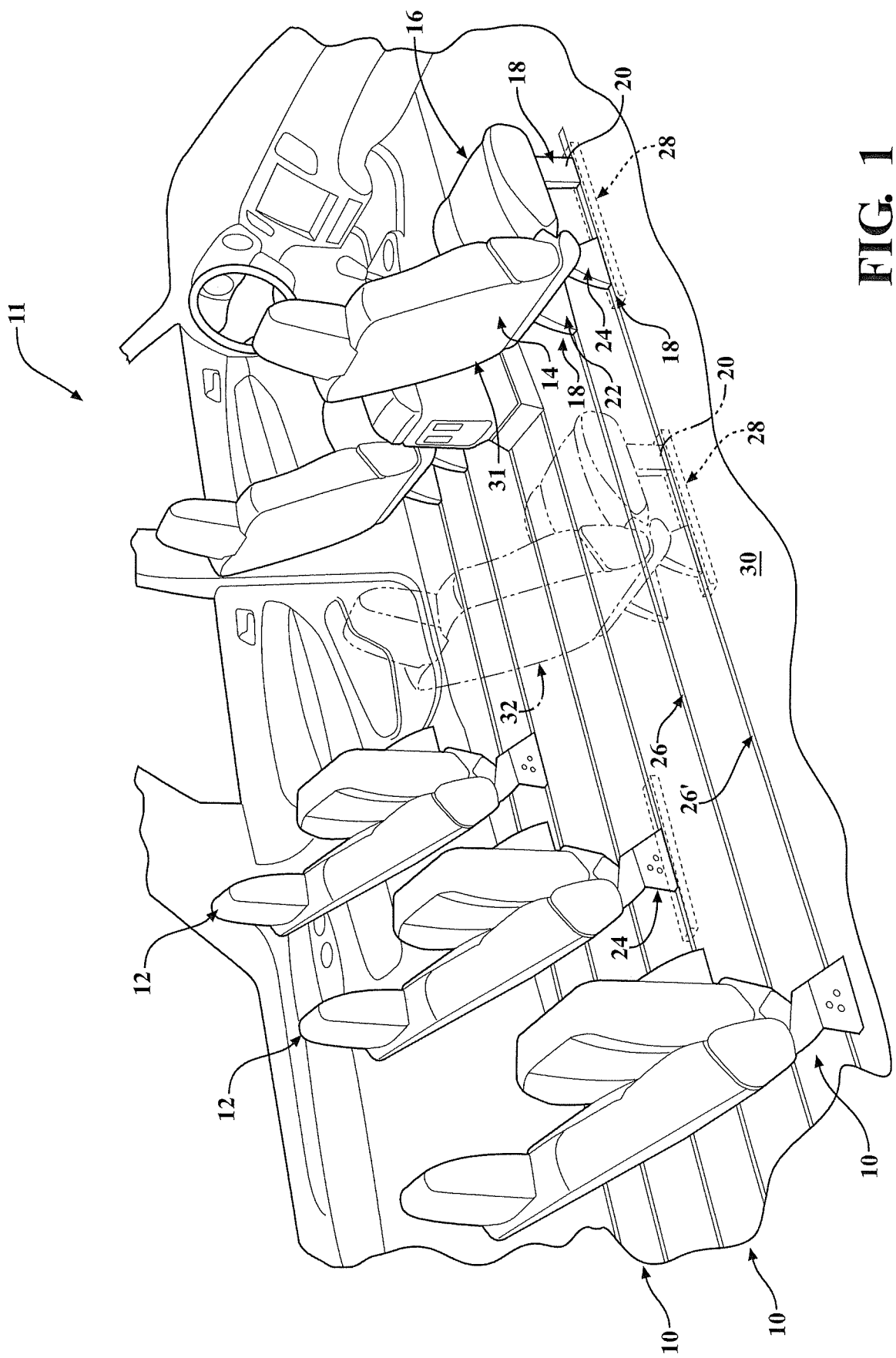
FIG. 1 is a fragmentary perspective view of a seat assembly and a long rail assembly in a vehicle interior according to one embodiment of the present invention.

FIG. 1 illustrates an interior 11 of a vehicle with a plurality of removable seat assemblies 12. Each seat assembly 12 includes a seat cushion 16 and a seat back 14 operatively coupled to the seat cushion 16 for supporting a seat occupant in a generally upright seating position. The seat cushion 16 is supported above the vehicle floor 30 by a mounting structure 18. The mounting structure 18 includes a pair of rear legs 22, 24, and may also include front legs 20.

The long rail assembly 10 includes a pair of fixed long rails 26, 26' secured to the vehicle floor 30 and a plurality of movable rails 28. The movable rails 28 are slidably coupled to the fixed long rails 26, 26' for longitudinal sliding movement relative thereto.

The mounting structure 18 of the removable seat assembly 12 is adapted to be removably secured onto the movable rail 28. The removable seat assembly 12 may be adjusted among a plurality of fore/aft seating positions along the vehicle floor 30. For example, the removable seat assembly 12 may be repositioned from a first seat location 31 to a second seat location 32 by sliding the movable rail 28 that is secured to the removable seat assembly 12 along the fixed long rails 26, 26'. Each removable seat assembly 12 may be decoupled from the movable rail 28, allowing the number of seat assemblies 12 within the vehicle interior 11 to be adjusted or varied as desired.

Figure 2:
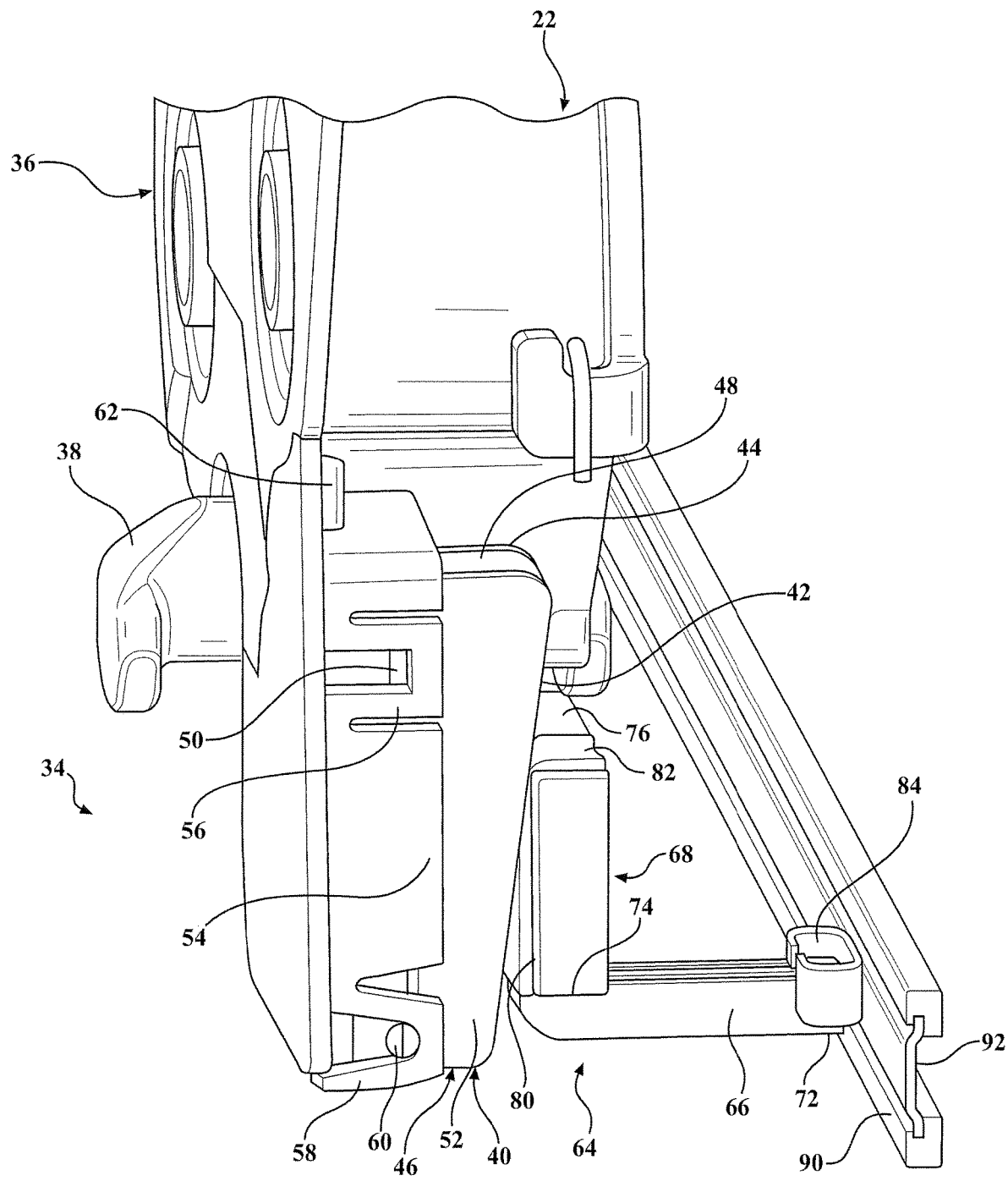
FIG. 2 is a fragmentary perspective view illustrating a portion of a power connection in a long rail assembly according to one embodiment of the present invention.
Figure 4:
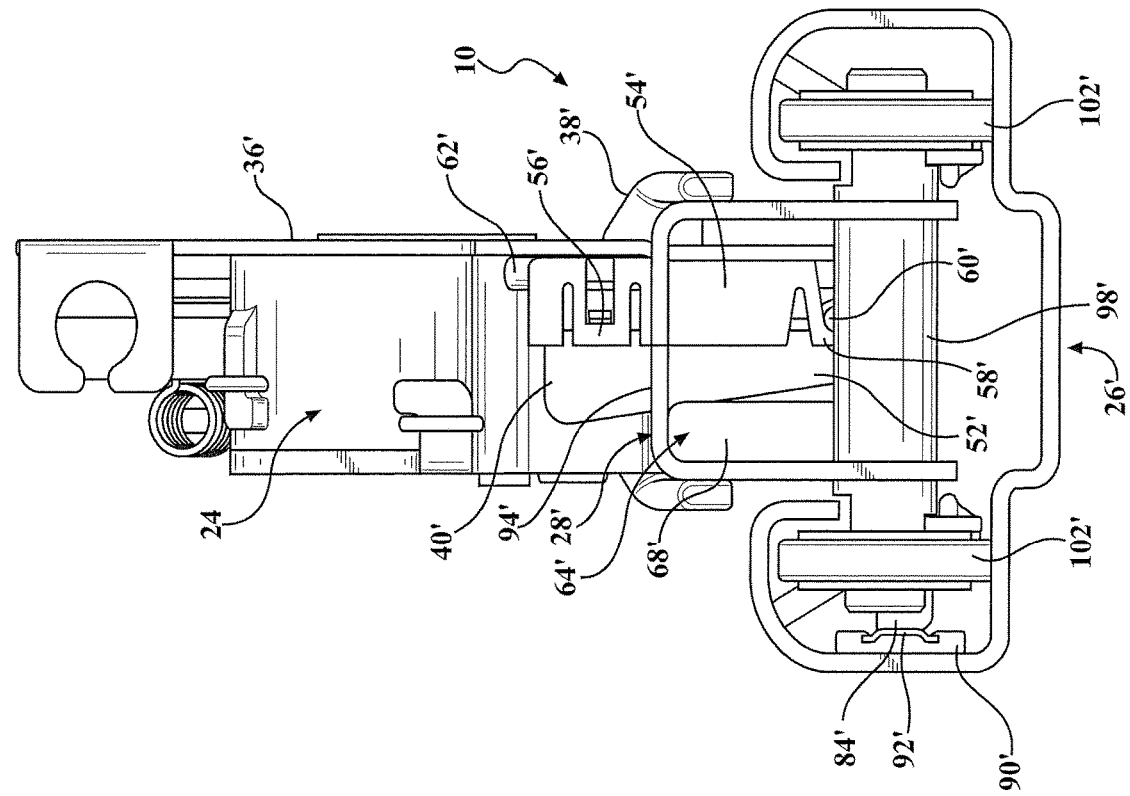
FIG. 4 is a fragmentary end view illustrating a power connection in a long rail assembly according to one embodiment of the present invention.
Figure 4:
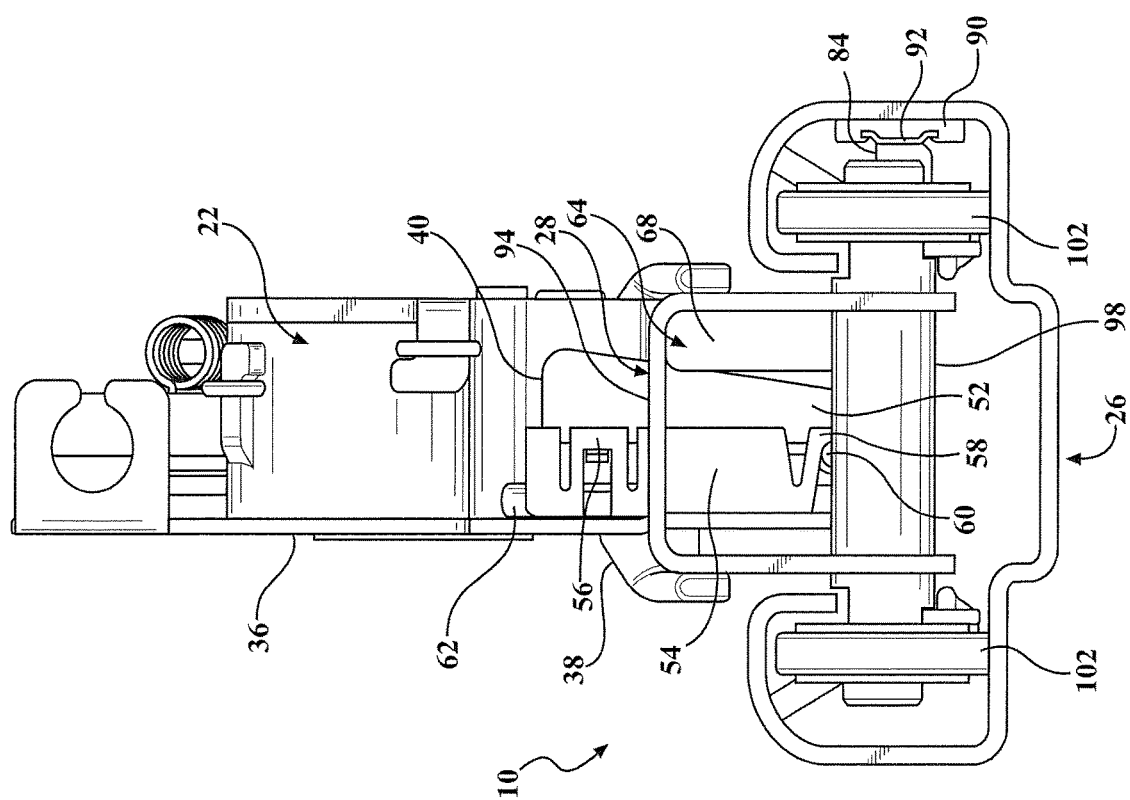

Referring to FIGS. 2 and 4, the long rail assembly 10 further includes a latch power connector assembly 34, an upper channel power connector 64 and a power strip 92. Preferably, the power strip 92 is designed for 12.8V DC and a 2% loss over 1500 mm length. A power strip bracket 90 mounts the power strip 92 onto the fixed long rail 26. The power strip bracket 90 may be comprised of a material, such as plastic, to electrically isolate the power strip 92 from the fixed long rail 26. The fixed long rail 26 preferably includes an electrodeposition coating to provide additional electrical isolation to prevent accidental short-circuiting between the fixed long rail 26 and the power strip 92. Although described in terms of the components for the left rear leg 22, the present invention includes corresponding structures on the right rear leg 24 represented by like primed reference numerals.

Figure 5:
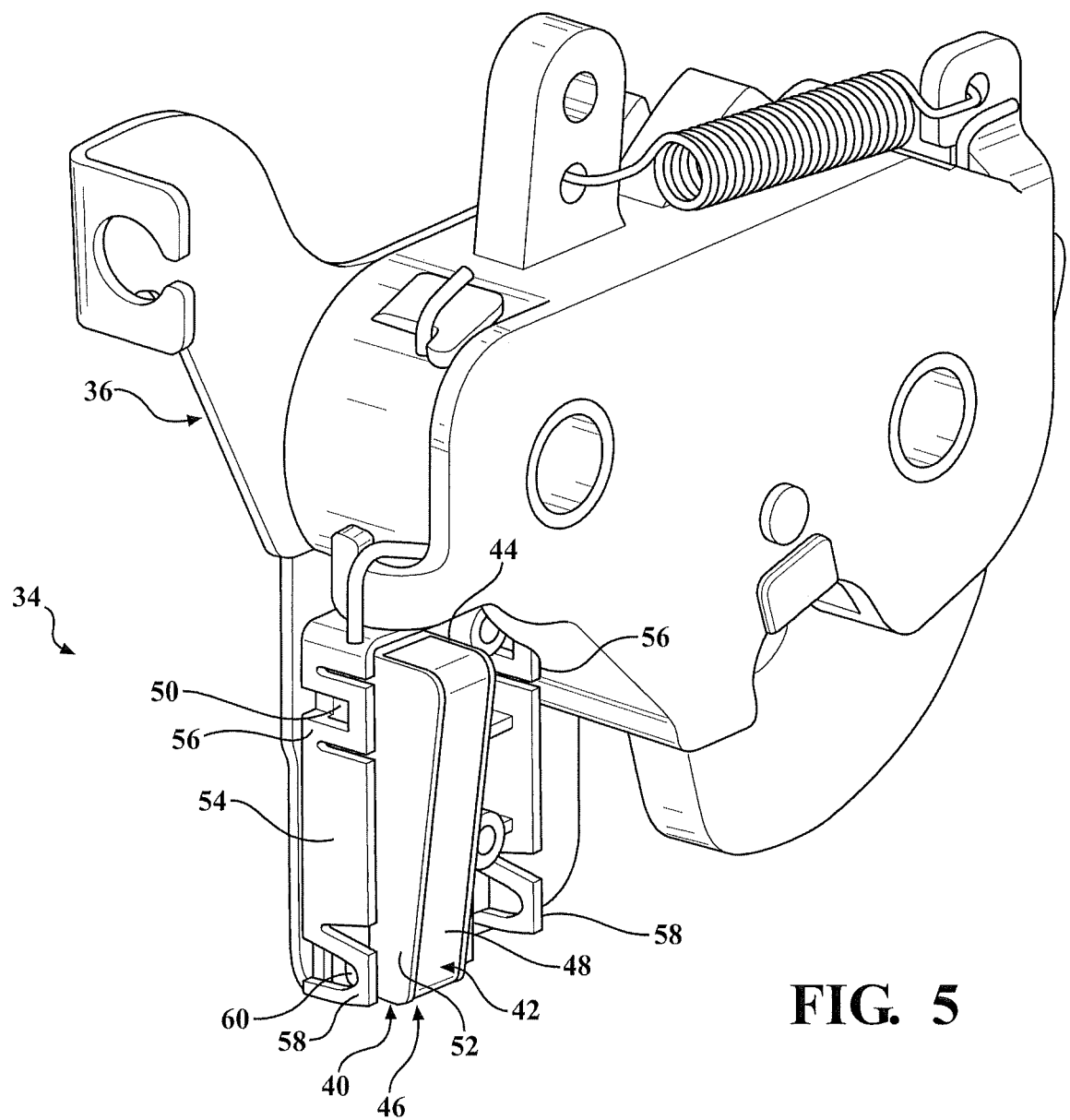
FIG. 5 is a perspective view of a latch power connector assembly according to one embodiment of the present invention.

Referring to FIGS. 2 and 5, the latch power connector assembly 34 includes a latch power connector 40 having a top end 44, a bottom end 46 and an angled surface 42 between the top end 44 and bottom end 46. The latch power connector 40 includes a conductive strip 48 extending at least along the top end 44 and the angled surface 42 of the latch power connector 40. A latch power connector bracket 54 fixedly couples the latch power connector 40 to the rear leg 22 of the removable seat assembly 12. Although the Figures and description include the latch power connector assemblies 34 coupled to the rear legs 22, 24 of the removable seat assemblies 12, the latch power connector assemblies 34 may alternatively be coupled to the front legs 20 of the removable seat assemblies 12 without altering the scope of the invention. The latch power connector 40 may be attached to the latch power connector bracket 54 through a set of clips 56 that snap over and onto a ridge 50 on a side wall 52 of latch power connector 40. In addition or alternatively, a bolt 60 may inserted into the side wall 52 of latch power connector 40 through a U shaped-opening 58 on the latch power connector bracket 54. It should be appreciated that the number and type of connections between the latch power connector 40 and latch power connector bracket 54 may vary without altering the scope of the invention.

Figure 6:
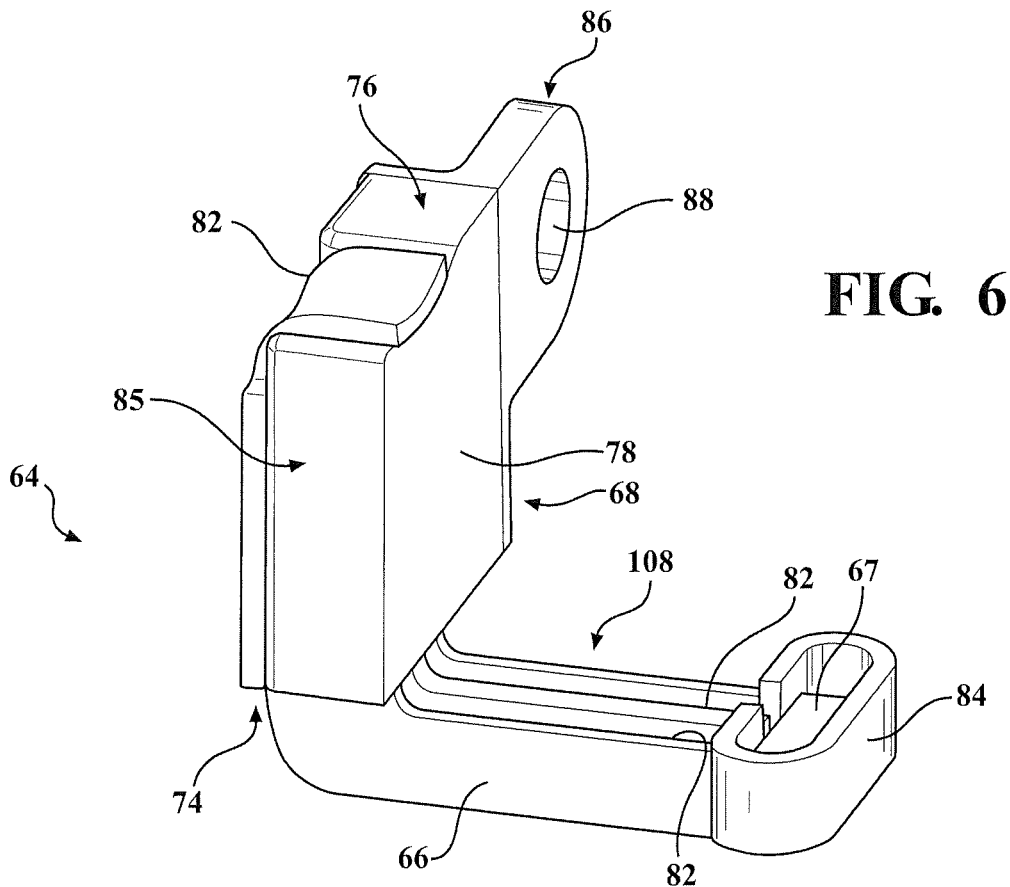
FIG. 6 is a top perspective view of an upper channel power connector according to one embodiment of the present invention.
Figure 7:
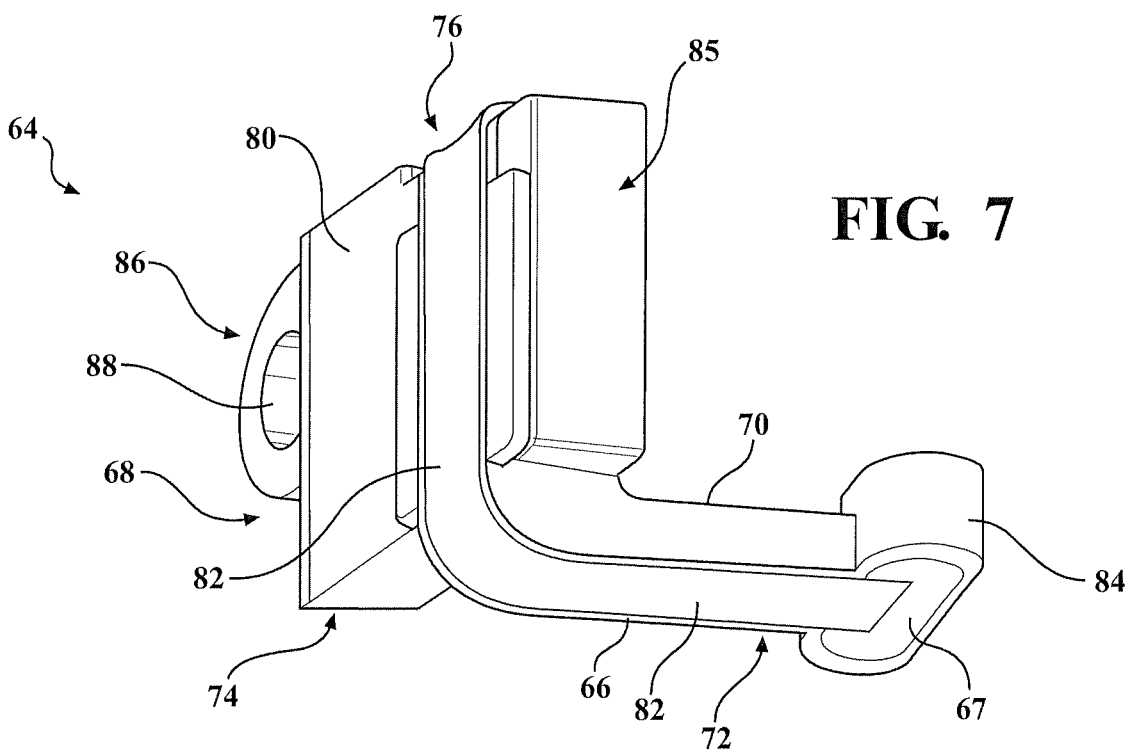
FIG. 7 is a bottom perspective view of an upper channel power connector according to another embodiment of the present invention.

Referring to FIGS. 2, 6 and 7, the upper channel power connector 64 includes an extension arm 66 and a mounting structure 68. The mounting structure 68 includes a main body 85 and a tab 86 extending from the main body 85. The tab 86 includes a central opening 88 through which a bolt, screw or other fastening means can be inserted for fixedly attaching the upper channel power connector 64 to the movable rail 28. The main body 85 has a top end 76 opposite the bottom end 74 and an inner face 78 opposite an outer face 80. The extension arm 66 is fixedly attached to a bottom end 74 of the main body 85, and extends from the main body 85 towards the power strip 92 mounted on the fixed long rail 26. The extension arm 66 has a top end 70 and an opposite bottom end 72, and includes a support structure 67 at the distal end of the extension arm 66.

The upper channel power connector 64 also includes a latch conductive strip 82 and a rail conductive strip 84. The latch conductive strip 82 extends at least from the top 76 of the main body 85, along the outer face 80 of the main body 85 and along the length of the extension arm 66 to the support structure 67. The rail conductive strip 84 wraps around the support structure 67, and is electrically coupled to the latch conductive strip 82. When the upper channel power connector 64 is mounted on the movable rail 28, the rail conductive strip 84 of the upper channel power connector 64 is in constant sliding contact with the power strip 92. The latch conductive strip 82 is in releasable contact with latch power connector 40 and more specifically with the conductive strip 48 of latch power connector 40. The contact points of the upper channel power connector 64 allow the upper channel power connector 64 to act as an electrical bridge between the latch power connector 40 and the power strip 92.

The latch conductive strip 82 may be molded into an inner surface 108 of extension arm 66, as depicted in FIG. 6, which electrically isolates the latch conductive strip 82 from other parts of the long rail assembly 10, such as the movable rail 28. Alternatively, the latch conductive strip 82 may be fixedly attached to the bottom surface 72 of the extension arm 66, as depicted in FIG. 7, which provides added cost savings during the manufacturing process as compared to the insert-molded process of FIG. 6.

Figure 3:
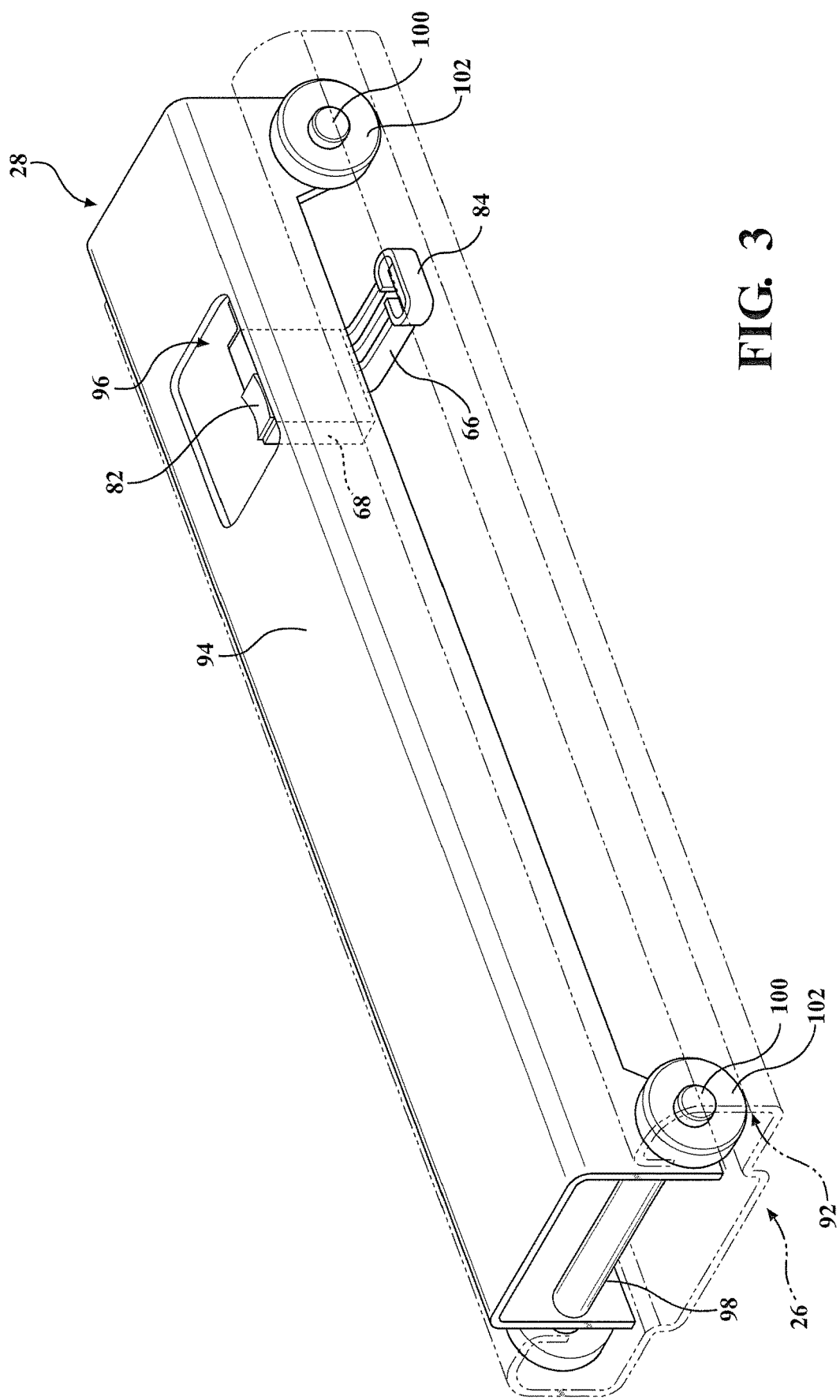
FIG. 3 is a partially transparent perspective view of an upper channel power connector coupled to a movable track according to one embodiment of the present invention.

Referring to FIG. 3, the movable rail 28 comprises an inverted U-shaped carrier with an opening 96 in a top wall 94 of the movable rail 28. Portions of the rear legs 22, 24 of the removable seat assemblies 12 and the latch power connector assembly 34 are inserted through the opening 96 when the legs 22, 24 are being secured onto the movable rail 28. The movable rail 28 also includes an axle 98 that extends laterally across the movable rail 28. Wheels 102 are fixedly coupled to the ends 100 of each axle 98 to allow for smooth movement of the movable rail 28 along the fixed long rail 26. Additional details regarding long rail assemblies for use in automotive vehicles are fully set forth in Applicant's co-pending application no. PCT/US19/62212, entitled "Removable Seat Used with a Long Rail Assembly," filed Nov. 19, 2019, and co-pending application no. PCT/US19/55835, entitled "Long Rail Assembly for Vehicle Seat Adjustment," filed Oct. 11, 2019, the disclosures of which are hereby incorporated by reference in their entirety.

Figure 8:
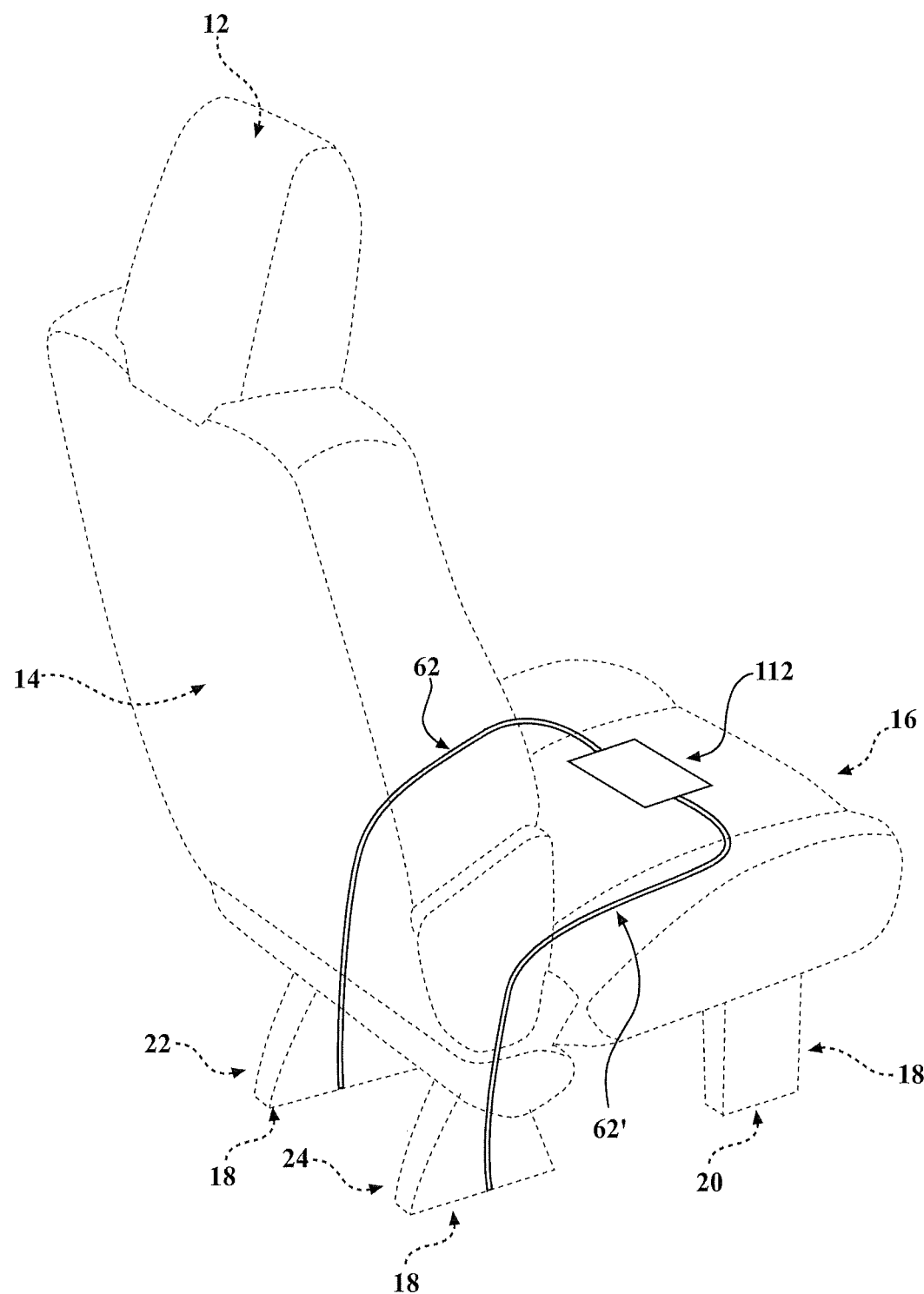
FIG. 8 is a partially transparent perspective view of a removable seat assembly according to one embodiment of the present invention.

Referring to FIG. 8, the seat cushion 16 in the removable seat assembly 12 may include an electronic control unit 112 to control power recliners, adjusters, latches and other electrical functions within the vehicle. Although depicted in the seat cushion 16, the electronic control unit 112 may be located elsewhere in the removable seat assembly 12, for example in the seat back 14, without altering the scope of the invention. Hard wires 62, 62' connect the electronic control unit 112 to latch power connector assemblies 34, 34'.

When installing a removable seat assembly 12, the rear legs 22, 24 and/or front legs 20 are lowered into the openings 96 in the top wall 94 of the movable rails 28, 28'. Latch assemblies 36, 36' latch onto strikers 38, 38', which are fixedly attached to the movable rail 28, 28'. The interaction between the latch assembly 36 and the striker 38 is the primary means of attachment and detachment of the removable seat assembly 12. It should be appreciated that the size, shape, number, and placement of the striker 38 may vary without altering the scope of the invention.

As the removable seat assembly 12 is being installed, the angled surface 42 of latch power connector 40 allows for gradual contact with the upper channel power connector 64 until the latch assembly 36 has fully latched onto the striker 38, at which point the latch power connector 40 is fully engaged with the upper channel power connector 64. The latch power connector 40 is configured to frictionally engage with the upper channel power connector 64 when the rear legs 22, 24 and/or front legs 20 are coupled with the movable rails 28, 28'. The angled surface 42 on the latch power connector 40 ensures that there will be an adequate frictional connection between the conductive strip 48 of the latch power connector 40 and the latch conductive strip 82 of the upper channel power connector 64 even when the latch power connector 40 and the upper channel power connector 64 are not perfectly aligned. Accordingly, the angled surface 42 allows for a wider range of manufacturing tolerance compared to a design in which the latch power connector 40 does not include an angled surface 42.

FIGS. 2 and 4 illustrate the power connection between the rear legs 22, 24 of the removable seat assembly 12 and the power strip 92, 92' on the fixed long rail 26, 26' when the removable seat assembly 12 is fully installed. As depicted, the long rail assembly 10 includes a pair of inverted U-shaped movable rails 28, 28' having wheels 102, 102' configured to travel along the fixed long rail 26, 26'. The power strips 92, 92' extend along an interior length of the fixed long rail 26, 26', with one power strip 92 providing the positive polarity and the second power strip 92' providing the negative polarity. Separating the positive and negative power strips 92, 92' lessens the chances of shorting the connection. Moreover, if the fixed long rails 26, 26' include an electrodeposition coating, both fixed long rails 26, 26' would need to be simultaneously flooded to short the power. The upper channel power connector 64, 64' is generally L-shaped and is fixedly coupled to the movable rail 28, 28'. Each upper channel power connector 64, 64' is slidably and electrically connected to the respective power strip 92, 92', and in releasable contact with the respective latch power connector 40, 40'. Thus, when the removable seat assembly 12 is fully installed, the removable seat assembly 12 may be repositioned along the fixed long rail 26, 26' while maintaining electrical connection to the power strips 92, 92'.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

The invention claimed is:

1. A long rail assembly for use in a vehicle comprising:
a fixed rail adapted to extend longitudinally along a floor of the vehicle;
a movable rail slidably coupled to the fixed rail;
a power strip coupled to the fixed rail;
a latch power connector removably coupled to the movable rail; and
a channel power connector fixedly coupled to the movable rail and in constant sliding contact with the power strip, wherein when the latch power connector is coupled to the movable rail, the latch power connector frictionally engages the channel power connector thereby generating an electrical bridge between the power strip and the latch power connector to provide power to the long rail assembly.

2. The long rail assembly as set forth in claim 1 wherein when the latch power connector is coupled to the movable rail, the power strip provides power to the long rail assembly during sliding movement of the movable rail along the fixed rail.

3. The long rail assembly as set forth in claim 1 further comprising a power strip bracket, wherein the power strip bracket electrically isolates the power strip from the fixed rail.

4. The long rail assembly as set forth in claim 3 wherein the fixed rail includes an electrodeposition coating to further electrically isolate the power strip from the fixed rail.

5. The long rail assembly as set forth in claim 1 wherein:
the channel power connector comprises a latch conductive strip coupled to a rail conductive strip; and
the latch power connector comprises a conductive strip;
wherein the latch conductive strip is releasably coupled with the conductive strip of the latch power connector and the channel conductive strip is in constant sliding contact with the power strip.

6. The long rail assembly as set forth in claim 5 wherein the latch power connector includes an angled surface extending between a first end and a second end and the conductive strip extends along the angled surface from the first end to the second end, wherein the angled surface allows the conductive strip to come into gradual contact with the latch conductive strip of the channel power connector when the latch power connector is being coupled to the movable rail.

7. The long rail assembly as set forth in claim 6 wherein the channel power connector further comprises an extension arm extending from the movable rail toward the fixed rail, wherein the latch conductive strip is molded into an inner surface of the extension arm and the latch conductive strip is affixed to a distal end of the extension arm.

8. The long rail assembly as set forth in claim 6 wherein the channel power connector further comprises an extension arm extending from the movable rail toward the fixed rail, wherein the latch conductive strip is affixed to an outer surface of the extension arm and the latch conductive strip is affixed to a distal end of the extension arm.

9. A long rail assembly for use in a vehicle comprising:
a first fixed rail adapted to extend longitudinally along a floor of the vehicle;
a second fixed rail adapted to extend longitudinally along the vehicle floor;
a first movable rail slidably coupled to the first fixed rail;
a second movable rail slidably coupled to the second fixed rail;
a first power strip coupled to the first fixed rail;
a second power strip coupled to the second fixed rail;
a first latch power connector removably coupled to the first movable rail;
a second latch power connector removably coupled to the second movable rail;
a first channel power connector fixedly coupled to the first movable rail and in constant sliding contact with the first power strip; and
a second channel power connector fixedly coupled to the second movable rail and in constant sliding contact with the second power strip,
wherein when the first latch power connector is coupled to the first movable rail and the second latch power connector is coupled to the second movable rail, the first latch power connector frictionally engages the first channel power connector thereby generating an electrical bridge between the first power strip and the first latch power connector and the second latch power connector frictionally engages the second channel power connector thereby generating an electrical bridge between the second power strip and the second latch power connector to provide power to the long rail assembly.

10. The long rail assembly as set forth in claim 9 wherein when the first latch power connector is coupled to the first movable rail and the second latch power connector is coupled to the second movable rail, the first power strip and the second power strip provide power to the long rail assembly during sliding movement of the movable rail along the fixed rail.

11. The long rail assembly as set forth in claim 9 wherein one of the first and second power strips has a positive polarity and the other of the first and second power strips has a negative polarity.

12. The long rail assembly as set forth in claim 9 further comprising a first power strip bracket and a second power strip bracket, wherein the first power strip bracket electrically isolates the first power strip from the first fixed rail and the second power strip bracket electrically isolates the second power strip from the second fixed rail.

13. The long rail assembly as set forth in claim 12 wherein the first fixed rail includes a first electrodeposition coating to further electrically isolate the first power strip from the first fixed rail and the second fixed rail includes a second electrodeposition coating to further electrically isolate the second power strip from the second fixed rail.

14. The long rail assembly as set forth in claim 9 wherein:
the first channel power connector comprises a first latch conductive strip coupled to a first rail conductive strip; and
the first latch power connector comprises a first conductive strip;
wherein the first latch conductive strip is releasably coupled with the first conductive strip of the first latch power connector and the first channel conductive strip is in constant sliding contact with the first power strip.

15. The long rail assembly as set forth in claim 14 wherein the first latch power connector includes an angled surface extending between a first and second end and the first conductive strip extends along the angled surface from the first end to the second end, wherein the angled surface allows the first conductive strip to come into gradual contact with the first latch conductive strip of the first channel power connector when the first latch power connector is being coupled to the first movable rail.

16. The long rail assembly as set forth in claim 15 wherein the first channel power connector further comprises an extension arm extending from the first movable rail toward the first fixed rail, wherein the first latch conductive strip is molded into an inner surface of the extension arm and the first latch conductive strip is affixed to a distal end of the extension arm.

17. The long rail assembly as set forth in claim 15 wherein the first channel power connector further comprises an extension arm extending from the first movable rail toward the first fixed rail, wherein the first latch conductive strip is affixed to an outer surface of the extension arm and the first latch conductive strip is affixed to a distal end of the extension arm.

18. In combination, a seat assembly and long rail assembly for use in a vehicle:
the seat assembly comprising a seat cushion;
a seat back operatively coupled to the seat cushion; and
a mounting structure to support the seat cushion above a floor of the vehicle;
the long rail assembly comprising a fixed rail adapted to extend longitudinally along the vehicle floor;
a movable rail slidably coupled to the fixed rail;
a power strip coupled to the fixed rail;
a latch power connector fixedly coupled to the mounting structure and removably coupled to the movable rail; and
a channel power connector fixedly coupled to the movable rail and in constant sliding contact with the power strip, wherein when the latch power connector is coupled to the movable rail, the latch power connector frictionally engages the channel power connector thereby generating an electrical bridge between the power strip and the latch power connector to provide power to the seat assembly.

19. The combination as set forth in claim 18 wherein when the latch power connector is coupled to the movable rail, the power strip provides power to the seat assembly during sliding movement of the movable rail along the fixed rail.

20. The combination as set forth in claim 18 further comprising a power strip bracket, wherein the power strip bracket electrically isolates the power strip from the fixed rail.

21. The combination as set forth in claim 20 wherein the fixed rail includes an electrodeposition coating to further electrically isolate the power strip from the fixed rail.

22. The combination as set forth in claim 18 wherein:
the channel power connector comprises a latch conductive strip coupled to a rail conductive strip; and
the latch power connector comprises a conductive strip;
wherein the latch conductive strip is releasably coupled with the conductive strip of the latch power connector and the channel conductive strip is in constant sliding contact with the power strip.

23. The combination as set forth in claim 22 wherein the latch power connector includes an angled surface extending between a first end and a second end and the conductive strip extends along the angled surface from the first end to the second end, wherein the angled surface allows the conductive strip to come into gradual contact with the latch conductive strip of the channel power connector when the latch power connector is being coupled to the movable rail.

24. The combination as set forth in claim 23 wherein the channel power connector further comprises an extension arm extending from the movable rail toward the fixed rail, wherein the latch conductive strip is molded into an inner surface of the extension arm and the latch conductive strip is affixed to a distal end of the extension arm.

25. The combination as set forth in claim 23 wherein the channel power connector further comprises an extension arm extending from the movable rail toward the fixed rail, wherein the latch conductive strip is affixed to an outer surface of the extension arm and the latch conductive strip is affixed to a distal end of the extension arm.

* * * * *